United States Patent

Sheets et al.

[11] Patent Number: 4,653,781
[45] Date of Patent: Mar. 31, 1987

[54] QUICK CONNECT COUPLING ASSEMBLY

[75] Inventors: Gerald R. Sheets, Springfield; Frederick A. Geiger, Huber Heights, both of Ohio

[73] Assignee: General Motors Corporation, Detroit, Mich.

[21] Appl. No.: 901,795

[22] Filed: Aug. 29, 1986

[51] Int. Cl.⁴ ............................................. F16L 17/02
[52] U.S. Cl. .................... 285/319; 285/323; 285/924
[58] Field of Search ............... 285/921, 319, 323, 343, 285/924

[56] References Cited

U.S. PATENT DOCUMENTS

| | | | |
|---|---|---|---|
| 3,151,893 | 10/1964 | Lyon | 285/343 X |
| 3,245,703 | 4/1966 | Manly | 285/921 X |
| 3,453,005 | 7/1969 | Foults | 285/82 |
| 3,933,378 | 1/1976 | Sandford et al. | 285/319 |
| 3,963,267 | 6/1976 | Legris | 285/323 X |
| 4,067,534 | 1/1978 | Frey | 285/921 X |
| 4,135,745 | 1/1979 | Dehar | 285/921 X |
| 4,193,616 | 3/1980 | Sarson et al. | 285/921 X |
| 4,220,361 | 9/1980 | Brandenberg | 285/921 X |
| 4,266,814 | 5/1981 | Gallagher | 285/921 X |

FOREIGN PATENT DOCUMENTS 50169 10/1966 German Democratic Rep. ......................... 285/343

*Primary Examiner*—Thomas F. Callaghan
*Attorney, Agent, or Firm*—Arthur N. Krein

[57] ABSTRACT

A quick connect coupling assembly includes a socket defined by a stepped bore in a body member, a tubular retainer nut threadingly received in the socket and a plug member carrying an O-ring seal that extends through the retainer nut and into the socket an axial extent whereby the O-ring seal is positioned to effect a seal relative to the plug member and an internal wall of the socket. The retainer nut having a shank portion defining circumferentially spaced apart flexible retainer fingers adapted to abut against an inclined radial shoulder of the plug member to effect its axial operative position within the socket.

2 Claims, 2 Drawing Figures

QUICK CONNECT COUPLING ASSEMBLY

FIELD OF THE INVENTION

This invention relates to quick connect type couplings and, in particular, to a quick connect coupling having a retainer nut that is adapted to retain a conduit plug in sealing engagement with an associate socket member.

DESCRIPTION OF THE PRIOR ART

In various fluid systems, conduits are connected together by various suitable coupling structures. One type of such coupling structures is commonly referred to as a quick connect coupling since the plug member, for example, in the form of a beaded tube or conduit carrying an O-ring seal is merely pushed axially into an associate socket member to effect its assembly thereto, the plug member then being retained axially within the socket member by means of a spring retainer or by means of C-shaped retainer clips.

Differing forms of these two types of quick connect couplings are well known as shown, for example, in U.S. Pat. No. 3,933,378 entitled "Quick-Connect Tubing Coupling" issued Jan. 20, 1976 to Sandford et al and U.S. Pat. No. 3,453,005 entitled "Quick-Connect Safety Coupling" issued July 1, 1969 to Jonathan A. Foults, respectively.

SUMMARY OF THE INVENTION

The present invention relates to an improved quick connect coupling wherein a socket member is provided with a stepped bore defining at its inboard end a tube receiving wall with a cam surface lead-in portion and defining at its outboard end an internally threaded wall to receive an externally threaded, hollow retainer nut having a plurality of flexible, radially inward extending retainer fingers at its inboard end and, a tube or conduit having a plug end which is provided adjacent to its free or inboard end with an O-ring seal operatively positioned in an annular groove provided in the plug end of a tube or conduit for this purpose, this plug end also being provided with an annular groove defining, at the inboard end of the plug, an abutment wall, axially spaced from the O-ring, which is adapted to be engaged by the retainer fingers of the retainer nut.

It is therefore a primary object of this invention to provide an improved quick connect coupling assembly which may be easily assembled and which may be easily disconnected while still permitting the automatic venting of the pressure from the coupling.

Another object of this invention is to provide an improved quick connect coupling assembly wherein a tubular, plastic, retainer nut having spring like retainer fingers is used to axially retain the plug end of a tube or conduit in sealed relationship within an associate socket member.

For a better understanding of the invention as well as other objects and further features thereof, reference is had to the following detailed description of the invention to be read in connection with the accompanying drawings.

DESCRIPTION OF THE PREFERRED EMBODIMENT

Figure 1:
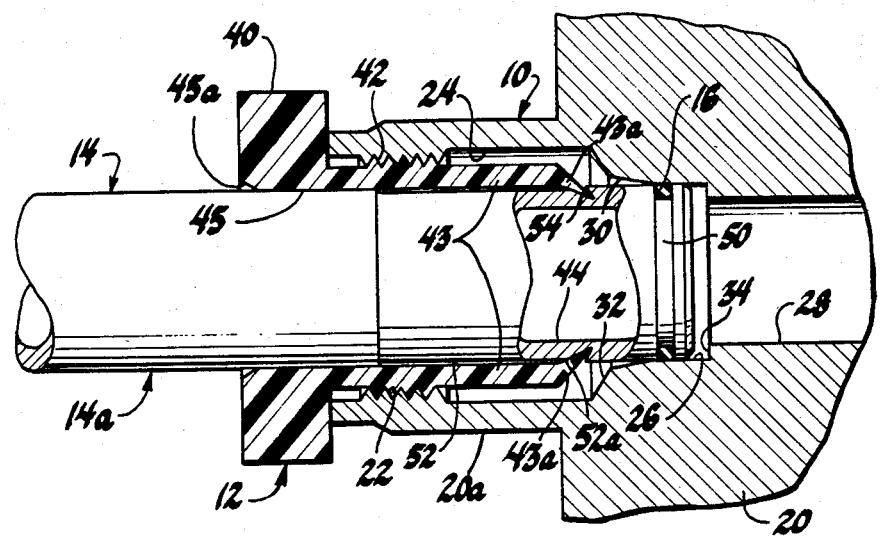
FIG. 1 is a cross-sectional view of the assembled quick connect coupling assembly in accordance with the invention, with the tube portion thereof shown in elevation; and, FIG. 2 is an exploded view of the elements of the quick connect coupling assembly of FIG. 1.
Figure 2:
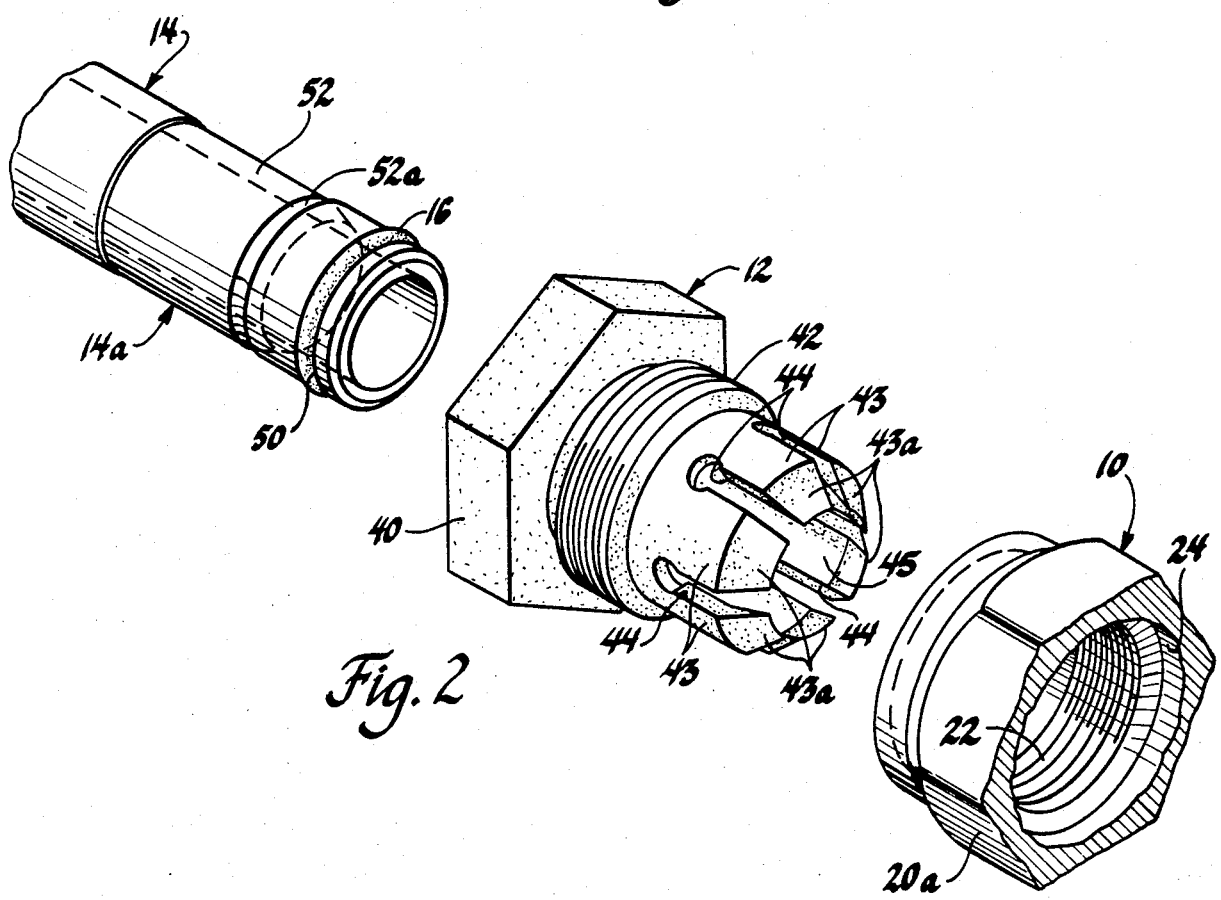

Referring now to FIGS. 1 and 2 of the drawings, the quick connect coupling of the invention includes, as major components thereof, an outer female socket member or socket 10, an externally threaded, hollow, retainer nut 12, a tubular plug member or male plug, hereinafter referred to as plug 14, and a fluid seal ring in the form of an O-ring seal 16.

The socket 10 is adapted to telescopically receive the plug 14 whereby these members are used to couple two fluid conduits together. These conduits, for example, may be tubes, conduit pipes, flexible hoses or conduit passages in machined elements. Thus the socket 10 may be a separate element with a conduit suitably secured thereto or, as shown, it may be formed as an integral part of a machine element.

Thus the socket 10, in the embodiment illustrated, is formed, for example, as an integral part of an element of a vehicle air-conditioning system, although it will be apparent, as described hereinabove, that this socket 10 can be formed as an integral end part of a body member in the form of a tube or other conduit member.

In the embodiment illustrated, the socket 10 is formed as part of a hex-head, boss-like, extension 20a of the machine element or body member 20 having formed therein a stepped socket bore that defines, in succession starting from the free or outboard end of the extension 20a, a cylindrical first or outboard end internally threaded wall 22, an enlarged second internal wall 24, a straight third wall 26 of reduced diameter relative to walls 22 and 24 and which is sized to slidably receive the free end of plug 14, and a further reduced diameter inboard wall 28, the latter forming a conduit or fluid passage into the interior of the element 20.

Wall 26 is connected to wall 24 by an inclined or outwardly flared cam surface 30 and by an inclined radial shoulder 32. Wall 26 is connected to wall 28 by a radial flat abutment shoulder 34.

The retainer nut 12 which is made of a suitable material, such as a plastic material, for example, nylon, which can either be machined or molded, includes an external wrenching head, such as hex head 40 having a hollow shank portion extending axially therefrom that includes an externally threaded portion 42 next adjacent to the head 40 for threaded engagement with the threaded wall 22 of the socket 10, with this shank portion at its free end being provided with a plurality of circumferentially equally spaced apart spring-like or flexible retainer fingers 43 with axially extending slots 44 separating adjacent retainer fingers 43 whereby these retainer fingers are independently flexible. As shown, each of the flexible retainer fingers 43, at its free or inboard end, the right hand end with reference to the Figures, is provided with an inward tapered wedge portion 43a.

As best seen in FIG. 2, the retainer nut 12 is provided with an axial through bore defining a plug 14 receiving cylindrical bore wall 45 extending through the head 40 and the externally threaded portion 42, while the retainer fingers 43, in the as-formed condition as shown in this Figure, depend radially inward toward the central axis of the retainer nut 12 a predetermined amount, as desired. However, these retainer fingers 43 being flexible, are adapted to be forced radially outward to slidably receive the free end of the plug 14 during insertion of this element through the nut retainer 12 into the socket 10. Preferably, as shown, bore wall 45 at its outboard end is provided with a cam ramp portion 45a.

The plug 14 may also be formed as a separate element with a conduit or hose suitably secured thereto or, as shown, it is formed as an integral part of a conduit which itself may be a separate element or part of a machine element. Thus as shown, the plug 14 is formed at one or free end of a conduit in the form of a tube 14a and is provided with an annular groove 50 located closely adjacent to its free or inboard end, the right end with reference to the Figures, in which is mounted a seal ring in the form of an O-ring seal 16 in the construction shown. For a predetermined axial distance outboard of this annular groove 50 the tube 14a is provided with a reduced diameter portion 52 which terminates at its inboard end with a further reduced diameter inclined annular groove 52a portion formed to provide an annular, radial, inclined abutment shoulder 54 facing toward the outboard or left hand end of the plug 14.

The inclined abutment shoulder 54 operates as an abutment shoulder or stop element positioned so as to be engaged by the free end or wedge portion 43a of each of the retainer fingers 43 when the plug 14 is inserted into the socket 10 in the position shown in FIG. 1 whereby the plug 14 will be retained against axial movement in one direction, that is, to the left with reference to this Figure. The remainder of the plug 14 has a nominal external diameter slightly larger than that of the portion 52 of the tube 14a portion in the construction illustrated. As will be apparent to those skilled in the art, depending on the material and wall thickness of the tube 14a, the grooves 50, 52 and 52a can be either cut or roll formed thereon in a manner well known in the art.

With the arrangement shown, the retainer nut 12 can be threaded into the socket 10 to the position shown in FIG. 1. Thereafter, the plug 14, with the O-ring seal 16 mounted into the groove 50, can be inserted through the bore wall 45 opening in the retainer nut 12, the cam ramp portion 45a thereof operating to force the outer peripheral portion of the O-ring seal 16 radially inward so as to allow its forced passage through the retainer nut and into the wall 26 portion of the socket 10, the flared cam surface 30 performing the same function so as to allow the O-ring seal 16 to enter into the wall 26 to effect a seal between this wall 26 and the bottom and a side wall defining the groove 50.

The plug 14, as it is forced through the retainer nut 12 will also force the retainer fingers 43 to move radially outward until such time as the abutment shoulder 54 moves past the free end of each of these retainer fingers 43 at which time these retainer fingers 43 can flex back toward their as-formed position to abut against the outer peripheral surface of the reduced diameter portions 52a or 52 so as to be in position whereby the wedge portions 43a of the retainer fingers 43 can engage against the abutment shoulder 54 whereby to effect axial retention of the plug 14 in socket 10, as in the position shown in FIG. 1.

However, if during assembly of the plug 14 as described, the assembler inadvertently forces the plug 14 axially inward into the socket 10 beyond the position shown, that is, to the right of the position shown with respect to FIG. 1, the free end of the plug 14 will then abut against the shoulder 34 and, of course, the retainer fingers 43 with their wedge portion 43a can flex radially inward whereby the wedge portions 43a will abut against the portion 52 or 52a of the plug 14. The assembler can then slowly withdraw the plug 14 axially outward until such time as the wedge portion 43a of the retainer fingers 43 can engage against the abutment shoulder 54. It should be noted however, that if the assembler fails to do the above, as soon as the pressure of fluid flowing through this coupling assembly, becomes sufficiently pressurized, it will act on the free end of the plug 14 so as to force it axially in an outward direction until such time as the wedge portions 43a of the retainer fingers 43 engage against the abutment shoulder 54 to thereby lock the plug 14 axially against further outward movement.

To effect disassembly, the retainer nut 12 should be slowly turned to effect its axial outward movement, to the left with reference to FIG. 1, to thus allow the plug 14 to also move to a position at which the O-ring seal 16 carried by it will be positioned adjacent to the flared cam surface 30 and then the radial shoulder 32 so that blow-down of any pressure in the subject coupling assembly can occur prior to the retainer nut 12 becoming fully detached from the socket 10 member.

While the invention has been described with reference to the structure disclosed herein, it is not confined to the specific details set forth, since it is apparent that many modifications and changes can be made by those skilled in the art. This application is therefore intended to cover such modifications or changes as may come within the purposes of the improvement or scope of the following claims.

The embodiments of the invention in which an exclusive property or privilege is claimed are defined as follows:

1. A quick connect, coupling assembly including a body member, a tubular retainer nut, a seal ring and a conduit having a plug at one end thereof, said body member having a plug receiving stepped socket bore extending from an outboard end thereof to define a first internally threaded wall, an enlarged internal second wall, a third wall of reduced diameter adapted to slidably receive said plug and a further reduced diameter inboard wall defining a fluid passage; said third wall and inboard wall being interconnected by a radial flat abutment shoulder and said third wall and said second wall being interconnected by a flared cam surface and an inclined ramp shoulder, said tubular retainer nut having a wrenching head with a shank extending therefrom said shank including an externally threaded portion next adjacent to said head for threaded engagement with said internally threaded wall of said body member with said wrenching head and said externally threaded portion having a plug receiving bore therethrough, said shank at its free end having a plurality of circumferentially spaced apart, flexible retainer fingers which as formed normally depend radially inward toward the central axis of the retainer nut so as to extend inward of said plug receiving bore, said plug having an annular groove adjacent to its free end with said seal ring operatively positioned therein for sealing engagement with said third wall, said plug further including an annular reduced diameter portion including an inclined annular inclined groove defining an inclined abutment shoulder facing toward the opposite end of said plug from said free end and axially positioned to be engaged by said retainer fingers of said retainer nut for axial retention of said plug in said retainer nut and in said socket in sealed engagement therewith.

2. A quick connect, coupling assembly including a body member, a tubular retainer nut, a seal ring and a conduit having a plug end, said body member having a plug end receiving stepped socket bore extending from an outboard end thereof to define a first internally threaded wall, an enlarged internal second wall, a third wall of reduced diameter adapted to slidably receive said plug end and a further reduced diameter inboard wall defining a fluid passage; said third wall and inboard wall being interconnected by a radial flat abutment shoulder and said third wall and said second wall being interconnected by a flared cam surface and an inclined ramp shoulder; said tubular retainer nut having an axial plug end receiving through bore, said retainer nut including a wrenching head with a shank extending therefrom, said shank including an externally threaded portion next adjacent to said head for threaded engagement with said internally threaded wall of said body member and at its free end said shank having a plurality of circumferentially spaced apart, flexible retainer fingers each terminating with an inward tapered wedge portion, these said retainer fingers as formed, normally depend radially inward toward the central axis of the retainer nut and extending inward of said bore said plug having an annular groove adjacent to its free end with said seal ring operatively positioned therein for sealing engagement with said third wall, said plug further including a reduced diameter portion that includes at one end thereof an annular groove defining an inclined abutment shoulder facing toward the opposite end of said plug from said free end and axially positioned to be engaged by said retainer fingers of said retainer nut whereby said plug is axially retained by said retainer nut against movement in one direction whereby said plug end is retained in said socket in sealed engagement therewith.

* * * * *